United States Patent [19]
Kim et al.

[11] Patent Number: 6,003,782
[45] Date of Patent: Dec. 21, 1999

[54] AERIAL SPRAY SYSTEM

[76] Inventors: Jitae Kim, 7266 Franklin Ave. #303, Los Angeles, Calif. 90046; Jong Hae Kim; Hyuntae Kim, both of 23212 Park Corniche, Calabasas, Calif. 91302

[21] Appl. No.: 08/775,416

[22] Filed: Dec. 31, 1996

[51] Int. Cl.⁶ .................................................. B64D 1/18
[52] U.S. Cl. .................. 239/171; 239/550; 239/416.1; 239/428; 169/53; 244/17.11; 244/137.4
[58] Field of Search .................................. 239/171, 407, 239/413, 416.1, 416.2, 416.3, 422, 428, 427, 427.3, 427.5, 550, 551, 566, 565, 556, 569; 244/17.11, 118.1, 136, 137.4; 89/41.21, 41.22; 169/53, 24, 52

[56] References Cited

U.S. PATENT DOCUMENTS

| | | | |
|---|---|---|---|
| 3,442,334 | 5/1969 | Gousetis | 169/53 |
| 3,445,065 | 5/1969 | Waldrum | 239/550 X |
| 3,580,339 | 5/1971 | Nance | 169/53 X |
| 3,641,261 | 2/1972 | Chaplin et al. | 89/41.21 X |
| 3,714,987 | 2/1973 | Mattson | 169/53 X |
| 3,887,129 | 6/1975 | Brown | 239/551 X |
| 3,901,467 | 8/1975 | Hawkshaw | 169/53 X |
| 4,012,989 | 3/1977 | Hunt et al. | 89/41.21 X |
| 4,393,597 | 7/1983 | Picard et al. | 89/41.21 X |
| 4,589,614 | 5/1986 | Stevens | 169/53 X |
| 4,993,665 | 2/1991 | Sparling | 244/137.4 X |
| 5,093,677 | 3/1992 | McMahon | 244/17.11 X |
| 5,129,309 | 7/1992 | Lecuyer | 89/41.21 X |
| 5,135,055 | 8/1992 | Bisson | 169/53 |
| 5,211,245 | 5/1993 | Relyea et al. | 169/24 |
| 5,279,481 | 1/1994 | Trotter et al. | 169/53 X |
| 5,381,962 | 1/1995 | Teague | 239/526 |

*Primary Examiner*—Andres Kashnikow
*Assistant Examiner*—Steven J. Ganey
*Attorney, Agent, or Firm*—Erik M. Arnhem

[57] ABSTRACT

An aerial spray system can be attached to the undersurface of a helicopter for spraying ground level targets while the helicopter is hovering or in level flight. A television camera can be located in near proximity to the spray nozzles for electronically delivering a picture of the ground level condition to a television monitor in the helicopter, such that the technician is better enabled to aim the spray nozzles or target a specific ground level area. The aerial system can be used for riot control, or crop spraying, or forest fire containment.

11 Claims, 2 Drawing Sheets

AERIAL SPRAY SYSTEM

BACKGROUND AND SUMMARY OF THE INVENTION

This invention relates to an aerial spray system especially usable on a helicopter for spraying ground level targets. The invention can be used for different purposes, e.g. spraying pesticides or liquid fertilizer solution onto crops, spraying water and/or chemicals onto forest fires, or spraying tear gas solutions onto crowds of rioting individuals.

In order to control riot situations, military forces or law enforcement agencies sometimes use tear gas guns or water cannon vehicles. However the range of such guns and cannons is somewhat limited to a maximum spray distance of about sixty meters. Also, riot control is hampered by inability of the ground vehicles to move readily through the crowds and/or the inability to have a clear overall view of the crowd that is to be contained or dispersed. Often, law enforcement personnel are subjected to unnecessary risk of thrown objects or sniper attack while attempting to gain information on the riot and/or to control the riot.

The present invention relates to an aerial spray system that can be mounted on the undersurface of a helicopter for spraying rioters or unruly gangs with tear gas solutions or other analogous toxic liquids. Preferably the spray system includes an exterior television camera targeted onto the spray nozzle target area, and a television monitor in the helicopter for displaying the picture taken by the camera; the camera-monitor system enables the helicopter pilot or other technician in the helicopter to see the exact ground area being sprayed at any one moment, thereby enabling the crowd or unruly persons of most concern to be pinpointed and quickly covered in an expeditious fashion.

Also, in preferred practice of the invention a colored dye is incorporated into the tear gas solution being sprayed onto the unruly individuals. The colored dye serves as a tracer for the tear gas solution, and also as an identifier of the unruly individuals causing or generating the disturbance.

A major advantage of the aerial spray system is that the helicopter can quickly traverse relatively large geographical areas, so as to enable law enforcement people in the helicopter to direct the toxic spray where it is most needed at any given moment. The helicopter and camera system provides an overhead view that is more informative than views at ground level. The overhead helicopter spray system is further advantageous in that prevailing winds can be largely eliminated as a cause of spray inaccuracies. The downspray of toxic liquid can be redirected on the basis of the tracer dye effect on the unruly crowd, such that the toxic materials can be delivered to the desired target in spite of wind conditions.

The aerial spray system has principal usage as a riot control device. However, the spray system can be used for other purposes, e.g. treatment of forest fires with water or fire extinguishing chemicals, or the overhead application of liquid fertilizers and pesticides to crops and ground vegetation. Further features of the invention will be apparent from the attached drawings and description of a preferred embodiment of the invention.

THE DRAWINGS

DESCRIPTION OF A PREFERRED EMBODIMENT OF THE INVENTION

Figure 1:
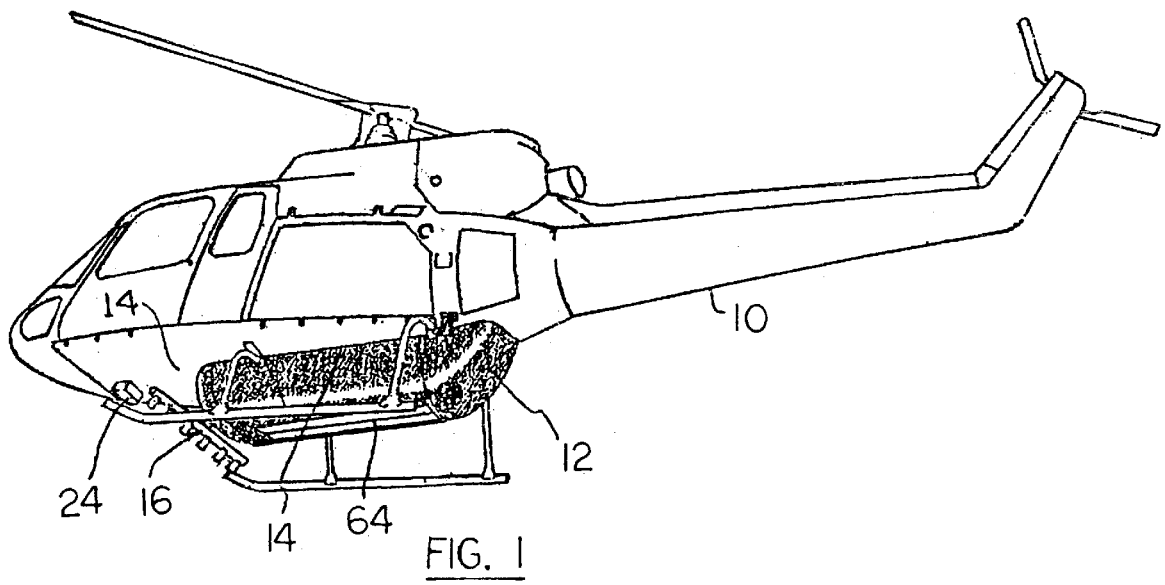
FIG. 1 is a perspective view of a helicopter equipped with an aerial spray system of the present invention.

FIG. 1 shows a helicopter 10 having an add-on housing 12 affixed to its undersurface 14. The componentry depicted in FIG. 3 is located within the housing (except for the spray nozzle means 16 that is located in front of housing 14).

Figure 3:
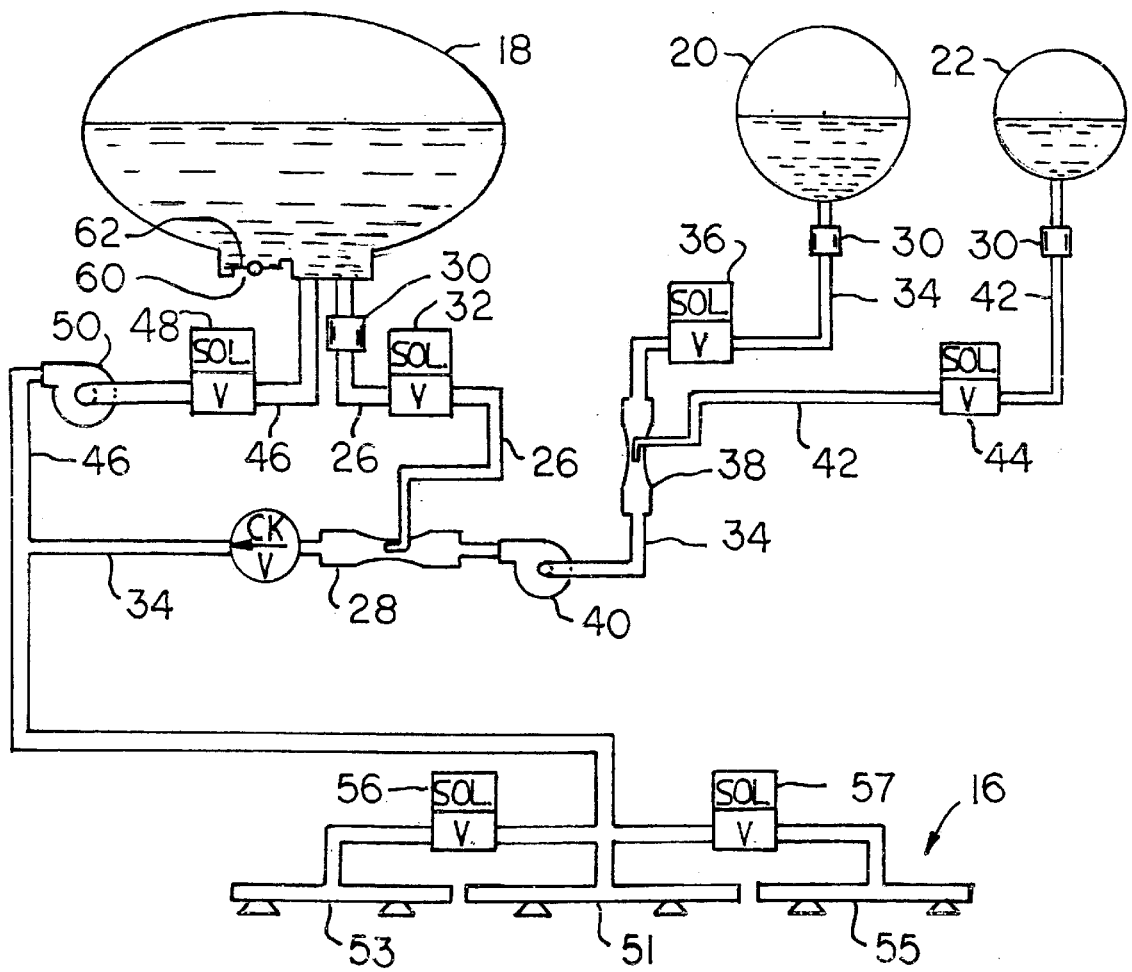
FIG. 3 is a diagrammatic view of a piping system used in the FIG. 1 aerial spray system.

The FIG. 3 componentry includes a first water tank 18, a second tank 20 containing a tear gas solution, and a third tank 22 containing a colored dye (e.g. a red dye). The FIG. 3 piping system is designed to selectively deliver the liquids in tanks 18, 20 and 22 to the nozzle means, in various combinations, e.g. water alone, or a mixture of water and tear gas solution, or a mixture of the tear gas solution and the colored dye. Various solenoid valves and pumps are incorporated into the piping system to achieve the selective delivery of particular liquids to spray nozzle means 16.

The various pumps and solenoid valves are electrically connected to manual switches located in a central control unit (or panel) in the helicopter, whereby a pilot or technician in the helicopter can have remote control of the liquid spray operation.

As shown in FIG. 3, the spray nozzle means 16 comprises six spray nozzles arranged in a single row; all six nozzles are oriented to spray generally downwardly from the helicopter undersurface toward ground level while the helicopter is in flight (hovering or moving horizontally at moderate speed). As shown in FIG. 1, the six nozzles are arranged in a single row transverse to the longitudinal axis of the helicopter. With this arrangement it is possible to spray a zone (or target an area) approximately as wide as the helicopter. By flying the helicopter forwardly at a moderate speed it is possible to spray a rectangular area corresponding to the helicopter width and flight length. Larger areas can be covered by multiple passes over a designated locality where a riot or disturbance is taking place.

Referring to FIG. 1, there is shown a television camera 24 located in near proximity to the spray-nozzle means 16. The camera is preferably located on the longitudinal centerline of the helicopter, and is sighted downwardly to view the target area in the spray path of nozzle means 16. A television monitor is located in the helicopter, preferably on the control panel used for controlling the aforementioned valves and pumps that effect delivery of liquid to spray nozzle means 16. Camera 24 is cable-connected to the television monitor, whereby the technician is able to remotely view the area being sprayed (or the area being considered for spraying).

In conjunction with camera 24, the spray system includes a mechanism for spraying colored dye from nozzle means 16 onto the ground level target. The colored dye impinging on persons in the spray path is visible in the picture taken by camera 24, such that the technician in the helicopter has visual feedback of the sprayed area. The colored dye also serves to identify (or help identify) persons participating in the riot or disturbance.

Referring to FIG. 3, the piping system comprises a first line 26 extending from water tank to a mixing apparatus 28. Line 26 contains a volumetric flow control 30 and a solenoid valve 32. Flow control 30 can be a commercially available device that maintains a relatively constant flow rate in the line in spite of supply pressure variations. The commercially available device can take the form of an elastomeric distortable element that responds to liquid pressure variations; alternately the device can be a spring-biased plunger movable into or out of a flow constricting throat structure. Such flow controls are commonly used in liquid piping systems to prevent fluctuations in the flow rate.

The piping system further comprises a second line 34 containing a second flow control 30, a second solenoid valve 36, a second mixing apparatus 38, and a motor-operated pump 40. A third line 42, containing a solenoid valve 44, extends from the liquid dye tank 22 to mixing apparatus 38.

The piping system also includes a line 46 from water tank 18 containing a solenoid valve 48 and motor-operated pump 50.

Spray nozzle means 16 comprises a central bank of nozzles 51, a left bank of nozzles 53, and a right bank of nozzles 55. Flow to the left and right nozzle banks is controlled by solenoid valves 56 and 57.

It can be seen that various liquid combinations can be delivered to the spray nozzles. For example, if only solenoid valve 48 and pump 50 are energized, water is delivered solely to the central bank of nozzles 51; this operational mode can be used to establish an aiming signal for the nozzle means. Other valves and pumps can be energized to deliver tear gas solution to the target area.

When only solenoid valve 36 and pump 40 are energized liquid tear gas solution can be delivered from tank 20 to the central bank of nozzles 51. If solenoid valves 56 and 57 are additionally energized, the liquid tear gas solution can be delivered to all three banks of nozzles.

By energizing solenoid valves 36 and 44, and pump 40, it is possible to deliver a mixture of tear gas solution and colored dye to the nozzle system. Solenoid valve 32 is energized when it is desired to dilute the tear gas solution with water. Different valve and pump combinations can be achieved, to meet different spray nozzle requirements and capabilities, as warranted by specific ground level conditions.

A primary use of the aerial spray system is the handling of riots or civil disturbances. However, the system can also be used for other purposes, e.g. applying fertilizers or pesticides to crops, or treating forest fires.

When the system is used to treat forest fires, water tank 18 is equipped with a bottom discharge port 60 that is normally closed by a butterfly valve 62. Preferably, valve 62 extends for a substantial portion of the tank 18 length, so that when the valve is open the entire water content of the tank is rapidly discharged. Valve 62 would usually be opened only when it is desired to dump a large quantity of water onto a forest fire. Valve 62 can be operated by a servo motor connected to one end of the valve shaft. The servo motor can be controlled from within the helicopter.

Figure 2:
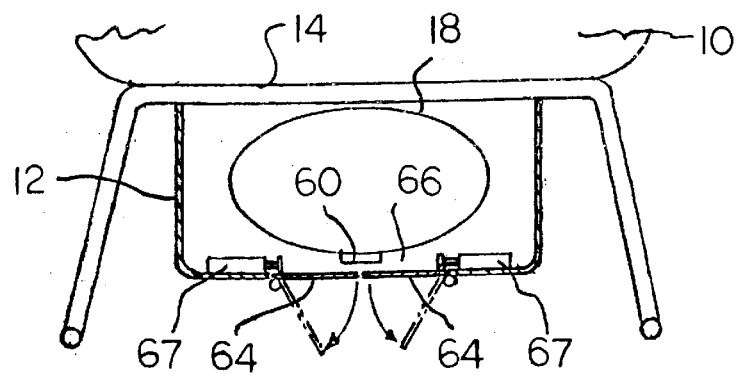
FIG. 2 is a transverse sectional view taken through a housing for the FIG. 1 aerial spray system.

As shown in FIGS. 1 and 2, housing 12 is equipped with a pair of downwardly swingable doors 64 normally closing a discharge opening 66 aligned with the aforementioned butterfly valve 62. Doors 64 can be opened by suitable power devices 67 that can take the form of motor-operated screws or fluid cylinders controlled from within the helicopter. Doors 64 would usually be opened only when it was intended to discharge water from tank 18 through butterfly valve 62.

The drawings necessarily show a specific construction for carrying out the invention. However, it will be appreciated that the invention can be practiced in various forms and configurations.

What is claimed:

1. A system for spraying liquid solutions from the undersurface of a helicopter downwardly onto ground level targets, comprising a liquid storage tank means; downwardly-directed spray nozzle means; a piping system connecting said liquid storage tank means to said spray nozzle means; a television camera sighted downwardly onto the nozzle target area; and a television monitor in the helicopter adapted to display the picture taken by the camera; said liquid storage tank means comprising a first water tank, a second tank containing a liquid tear gas solution, and a third tank containing a liquid dye; said piping system comprising a first mixing means for mixing water from the first tank with tear gas solution from the second tank to produce a dilute tear gas solution, a second mixing means for mixing tear gas solution from the second tank with liquid dye from the third tank to produce a colored tear gas solution, a first pump for pumping water from the water tank directly to the spray nozzle means, and a second pump for pumping tear gas solution and colored tear gas solution to said spray nozzle means.

2. The system of claim 1, wherein said spray nozzle means comprises a central bank of nozzles, a left hand bank of nozzles, and a right hand bank of nozzles; said piping system comprising a first solenoid valve controlling liquid flow to the left bank of nozzles, and a second solenoid valve controlling liquid flow to the right hand bank of nozzles.

3. The system of claim 2, and further comprising an electrically-operated valve means (44) for controlling the flow of liquid dye to said second mixing means.

4. A system for spraying liquid solutions from the undersurface of a helicopter downwardly onto ground level targets, comprising a liquid storage tank means; downwardly-directed spray nozzle means; a piping system connecting said liquid storage tank means to said spray nozzle means; a television camera sighted downwardly onto the nozzle target area; and a television monitor in the helicopter adapted to display the picture taken by said camera; said liquid storage tank means comprising a first water tank, and a second tank containing a second liquid solution; said water tank having a bottom discharge port means (60) for rapid gravitational discharge of the water content out of said water tank, and a motor-operated valve (62) for opening said discharge port means.

5. The system of claim 4, wherein said motor-operated valve is a butterfly valve.

6. The system of claim 4, and further comprising a housing (12) enclosing said liquid storage tank means and said piping system; said housing having a bottom water discharge opening (66) aligned with the bottom discharge port means on said water tank, and a pair of downwardly-swingable doors (64) spanning said water discharge opening.

7. The system of claim 4, and further comprising a housing (12) enclosing said liquid storage tank means and said piping system; said housing having a bottom water discharge opening (66) aligned with the bottom discharge port means on said water tank, a pair of downwardly-swingable doors (64) spanning said water discharge opening, and a power means for opening or closing said doors.

8. The system of claim 4, and further comprising a housing (12) enclosing said liquid storage tank means and said piping system; said housing having a bottom water discharge opening (66) aligned with the bottom discharge port means on said water tank, a pair of downwardly-swingable doors (64) spanning said water discharge opening, and a power means for opening or closing said doors; said spray nozzle means comprising a row of spray nozzles extending transverse to the helicopter longitudinal axis forwardly from said housing.

9. The system of claim 4, and further comprising a housing (12) enclosing said liquid storage tank means and said piping system; said housing having a bottom water discharge opening (66) aligned with the bottom discharge port means on said water tank, a pair of downwardly-swingable doors (64) spanning said water discharge opening, and a power means for opening or closing said doors; said spray nozzle means comprising a row of spray nozzles extending transverse to the helicopter longitudinal axis forwardly from said housing; said television camera being located in close proximity to said row of spray nozzles.

10. A system for spraying liquid solutions from the undersurface of a helicopter downwardly onto ground level targets, comprising a liquid storage tank means; downwardly-directed spray nozzle means; a piping system connecting said liquid storage tank means to said spray nozzle means; a television camera sighted downwardly onto the nozzle target area; and a television monitor in the helicopter adapted to display the picture taken by the camera; said spray nozzle means comprising a central bank of nozzles, a left hand bank of nozzles, and a right hand bank of nozzles; said liquid storage tank means comprising a first tank containing a liquid tear gas solution, and a second tank containing a liquid dye; said piping system comprising a mixing means for mixing liquid tear gas solution from said first tank with liquid dye from said second tank to produce a liquid mixture, a pump for pumping said liquid mixture and said tear gas solution from said first tank to said spray nozzle means, a first solenoid valve controlling liquid flow to the left hand bank of nozzles, and a second solenoid valve controlling liquid flow to the right hand bank of nozzles.

11. The system of claim 10, and further comprising an electrically-operated valve means (44) for controlling the flow of liquid dye from said second tank to said mixing means.

\* \* \* \* \*